United States Patent Office 3,152,863
Patented Oct. 13, 1964

3,152,863
LOW-CAKING SODIUM CHLORIDE CONTAINING AMMONIUM FERRIC CITRATE
James Saunders, Edinburgh, Scotland, assignor to A. & R. Scott Limited, Edinburgh, Scotland, a British company
No Drawing. Filed Aug. 21, 1962, Ser. No. 218,422
6 Claims. (Cl. 23—89)

This invention is concerned with improvements in or relating to the production of sodium chloride having a low tendency to caking in moist atmosphere.

When crystalline sodium chloride is stored in contact with air, it is generally found that the crystals agglomerate or cake and, where this condition is undesirable, the caked salt has to be subjected to a further processing. This tendency to caking is more pronounced in humid atmospheres and may also be affected by temperature, pressure and storage time.

Caking is generally recognised as depending largely on the crystalline nature of the salt, since an increase in the size and uniformity of the grains is found to reduce the tendency and cubic salt formed by crystallisation from deep solutions has notably more tendency to cake than, for example pan salt which is formed on the brine surface.

We have found that the tendency of cubically crystalline sodium chloride to caking may be reduced in particular advantageous manner if ammonium ferric citrate is added to the solid crystalline salt.

The additive should preferably be distributed as uniformly as possible over the total crystal surface of the salt since in this way a minimal quantity of the compound will produce the desired effect. For this reason, it is convenient to add an aqueous solution of the additive to the crystalline sodium chloride and this can advantageously be carried out either by atomising the solution onto salt which has been separated from the mother liquor, and is either in the wet or dry state, or by adding the additive to the crystalline salt while still suspended in the mother liquor followed by any convenient separation process.

The additive used according to the invention can, as stated above, be employed in extremely small quantities so that salt of reduced caking tendency may be obtained in high purity. In general, there is an optimum quantity of the additive required to produce the maximum effect in a given weight of salt, although this is found to vary to some extent with the grain size of the salt crystals. For salt of crystal size approximately 0.3 mm., we have found that these optimum quantities lie generally between 0.0001 and 0.002% of the weight of sodium chloride. In many cases, quantities of the additive as low as 0.00002% may be effective in reducing caking where storage conditions are favourable, although with very low percentages it is essential that the additive be uniformly distributed over the total crystal surface of the salt. Indeed, if uniform distribution is not obtained, increased quantities of the additive may be necessary.

When the quantity of the additive per unit crystal surface is calculated, it is rather surprisingly found that, if completely uniform coverage were possible, there is often insufficient absorbed material to cover completely the crystals with a monomolecular crystalline layer. In other words, since completely uniform coverage is scarcely attainable, the crystal surface is not necessarily completely covered by the added compound.

A major advantage of the present process is that, since the compounds employed are water-soluble, the salt, on dissolution in water, gives a clear solution.

The salt produced by the present process, although possessing a reducing tendency to caking, may not necessarily be sufficiently free-flowing and it is, therefore, often advantageous to add to salt prepared by the present process one or more of the customary salt additives, for example, magnesium carbonate.

In order that the invention may be well understood, we give the following examples by way of illustration only:

*Example 1*

A stream of salt at 80°, moisture content of 0.1% and mean grain size of 0.01", is fed through a worm conveyor at a rate of 10 tons per hour and a 2.0% solution of ammonium ferric citrate is atomised onto the stream at a rate of 1.7 gallons per hour. The salt is then cooled and dried. The average content of ammonium ferric citrate is 15 parts per million.

*Example 2*

A 2% solution of ammonium ferric citrate is atomised at a rate of 0.4 gallon per hour onto a stream of cold dry salt fed through a worm conveyor at a rate of 2 tons per hour.

I claim:
1. A process for reducing the caking tendency of crystalline sodium chloride in which there is added to the crystalline sodium chloride the compound ammonium ferric citrate.
2. A process as claimed in claim 1 in which the ammonium ferric citrate is added to the crystalline sodium chloride in the form of an aqueous solution.
3. A process as claimed in claim 1 in which the quantity of ammonium ferric citrate added is such that its concentration is at least 0.00002% by weight of the sodium chloride.
4. A process as claimed in claim 3 in which the quantity of ammonium ferric citrate is such that its concentration is 0.0001% to 0.002% by weight of sodium chloride, the average crystal size of the sodium chloride being approximately 0.3 mm.
5. Crystalline sodium chloride with ammonium ferric citrate carried on the surface of the crystals thereof, the ammonium ferric citrate comprising at least 0.00002% by weight of the sodium chloride.
6. A product as claimed in claim 5 in which the average crystal size is approximately 0.3 mm. and the ammonium ferric citrate comprises 0.0001% to 0.002% by weight of the sodium chloride.

References Cited in the file of this patent
UNITED STATES PATENTS
2,642,335      May et al. _____ June 16, 1953
FOREIGN PATENTS
495,239      Great Britain _____ Nov. 9, 1938